United States Patent
Anderson et al.

(10) Patent No.: US 12,235,565 B2
(45) Date of Patent: Feb. 25, 2025

(54) MICROWAVE-TO-OPTICAL PHOTON TRANSDUCER

(71) Applicant: MIRAEX SA, Ecublens (CH)

(72) Inventors: Mitchell Anderson, Pully (CH); Clément Javerzac-Galy, Vulliens (CH); Olexiy Feofanov, Epalinges (CH)

(73) Assignee: MIRAEX SA, Ecublens (CH)

( * ) Notice: Subject to any disclaimer, the term of this patent is extended or adjusted under 35 U.S.C. 154(b) by 207 days.

(21) Appl. No.: 17/925,163

(22) PCT Filed: May 7, 2021

(86) PCT No.: PCT/IB2021/053887
§ 371 (c)(1),
(2) Date: Nov. 14, 2022

(87) PCT Pub. No.: WO2021/229389
PCT Pub. Date: Nov. 18, 2021

(65) Prior Publication Data
US 2023/0185159 A1    Jun. 15, 2023

(30) Foreign Application Priority Data
May 15, 2020  (EP) ................................... 20174866

(51) Int. Cl.
*G02F 1/365* (2006.01)
*G02F 1/35* (2006.01)
*G02F 1/39* (2006.01)

(52) U.S. Cl.
CPC .............. *G02F 1/365* (2013.01); *G02F 1/353* (2013.01); *G02F 1/3546* (2021.01); *G02F 1/395* (2013.01)

(58) Field of Classification Search
CPC ........ G02F 1/353; G02F 1/3546; G02F 1/365; G02F 1/395
See application file for complete search history.

(56) References Cited

U.S. PATENT DOCUMENTS

| 8,331,008 B1 | 12/2012 | Matsko |
| 10,824,048 B2 * | 11/2020 | Qasymeh ................ G02F 1/353 |

(Continued)

OTHER PUBLICATIONS

International Search Report and Written Opinion as issued by the International Searching Authority, dated Jul. 29, 2021, for International Patent Application No. PCT/IB2021/053887; 10 pages.

(Continued)

*Primary Examiner* — Daniel Petkovsek
(74) *Attorney, Agent, or Firm* — Faegre Drinker Biddle & Reath LLP

(57) ABSTRACT

A microwave-to-optical photon transducer is provided for generating coupling between a microwave signal ($S_{in2}$) and an optical signal ($S_{pi\_in1}$, $S_{pi\_out1}$). The transducer comprises: a first input port; a second input port; a first output port for outputting the optical signal ($S_{pi\_out1}$) and one or more optical sideband signals ($S_{out1}$, $S_{out11}$, $S_{out12}$); a first waveguide disposed between the first input port and the first output port to allow the optical signal ($S_{pi\_in1}$) and the one or more optical sideband signals ($S_{out1}$, $S_{out11}$, $S_{out12}$) to propagate in the first waveguide; a second waveguide connected to the second input port, and extending in the transducer adjacent to the first waveguide to allow the microwave signal ($S_{in2}$) to propagate in the second waveguide; a phase-matching arrangement to cause at least the optical signal ($S_{pi\_in1}$) and the microwave signal ($S_{in2}$) to be phase-matched or quasi-phase-matched.

17 Claims, 8 Drawing Sheets

(56) References Cited

U.S. PATENT DOCUMENTS

| | | | |
|---|---|---|---|
| 10,955,726 B2* | 3/2021 | Orcutt | G02B 6/29335 |
| 11,506,953 B2* | 11/2022 | Stark | G01V 11/002 |
| 2017/0248832 A1 | 8/2017 | Kippenberg | |
| 2019/0270635 A1* | 9/2019 | Painter | B82Y 20/00 |
| 2020/0285131 A1* | 9/2020 | Marandi | G02F 1/39 |
| 2023/0350268 A1* | 11/2023 | Anderson | G02F 1/3534 |

OTHER PUBLICATIONS

Duport, et al. "Optical to microwave conversion in a traveling wave electro-optic polymer based device", Advances in Resist Technology and Processing XVI, vol. 6117, Feb. 9, 2006; 12 pages.

Rueda, et al. "Efficient single sideband microwave to optical conversion using an electro-optical whispering gallery mode resonator", Arxiv.org, Cornell University Ithaca, NY, 14853, Jan. 27, 2016; 8 pages.

* cited by examiner

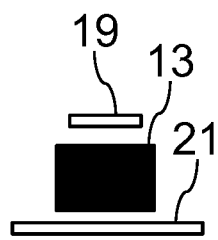 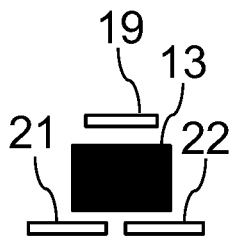 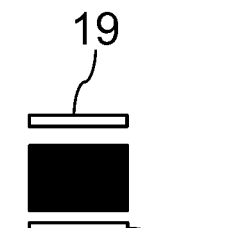 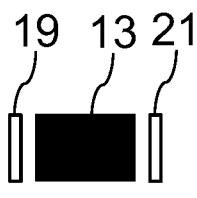
Fig. 4a  Fig. 4b  Fig. 4c  Fig. 4d
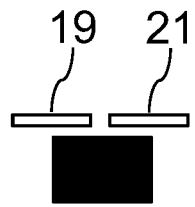 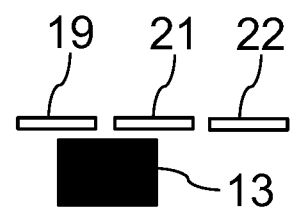 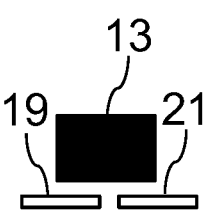 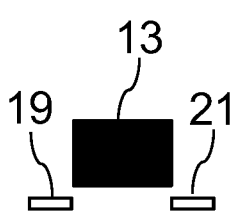
Fig. 4e  Fig. 4f  Fig. 4g  Fig. 4h
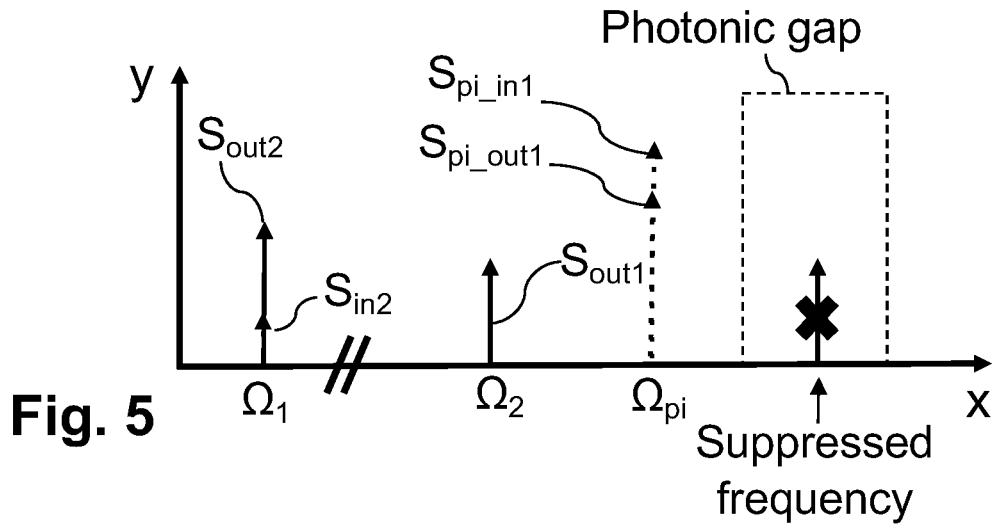
Fig. 5
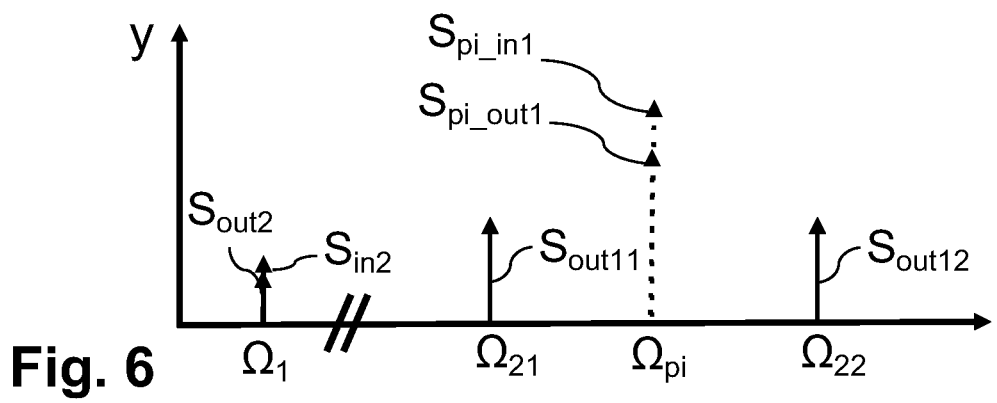
Fig. 6

MICROWAVE-TO-OPTICAL PHOTON TRANSDUCER

CROSS-REFERENCE TO RELATED APPLICATIONS

The present application is a national stage entry of International (PCT) Patent Application Number PCT/IB2021/053887, filed May 7, 2021, which claims priority to European Patent Application Number 20174866.2, filed May 15, 2020, the complete disclosures of which are expressly incorporated herein by reference.

TECHNICAL FIELD

The present invention relates to an apparatus configured to couple microwave and optical signals. More specifically, the apparatus is configured as a microwave-to-optical photon transducer. The proposed apparatus may be used to measure microwave signals by detecting optical output signals of the apparatus, as the optical output signals are proportional to the microwave input signals. The invention also relates to a corresponding method of operating the apparatus.

BACKGROUND OF THE INVENTION

Microwave or superconducting circuits are generally placed in a cryogenic environment, often called a microwave stage, to minimise ambient noise. Weak microwave signals, especially those that carry quantum information about the quantum state of the quantum system of interest, are very sensitive to any additional noise, which may be generated by a detector designed to measure the microwave signals. For example, a detector may have a power supply and it may dissipate some thermal energy creating thermal noise, which would destroy the quantum state and/or reduce the sensitivity of the detector. This would mean that the detector would no longer be able to measure single microwave photons. Some solutions exist to directly measure microwave photons. However, these solutions require the detector to be placed inside the cooled microwave stage. These solutions further have the drawback that the detectors dissipate too much energy, which increases thermal noise inside the microwave stage. The noise can in turn cause the quantum state to collapse. This means that the solutions are usable to detect single microwave photons only after a given recovery phase.

It is also known how to measure microwave signals at room temperature from microwave signals originating from cooled microwave stages. However, these solutions have the drawback that many amplifiers and electrical wiring are needed between the detector device and the cooled microwave stage. Unfortunately, amplifiers and electrical wiring are thermal noise sources and also require lots of space.

US20170248832A1 discloses a microwave to optical conversion device comprising: a superconducting microwave resonator, and an optical resonator including an electro-optical material. The superconducting microwave resonator and the optical resonator are arranged one with respect to the other so as to be electro-magnetically coupled.

SUMMARY OF THE INVENTION

It is an object of the present invention to overcome at least some of the problems identified above related to arrangements for detecting both single microwave photons and weak continuous microwave signals.

According to a first aspect of the invention, there is provided a microwave-to-optical photon transducer as recited in claim 1.

The proposed new solution has the advantage that the transducer can be used to measure microwave quantum state signals or low-level microwave signals without substantially dissipating energy or dissipating energy much less than in prior art solutions. This can be achieved without disturbing the quantum state and/or the microwave measurement stage. The proposed solution allows the measurement of every photon of a microwave signal flux, and with a high repetition rate. Furthermore, the proposed solution drastically reduces the amount of electrical wiring inside, and connected to, the cryogenic environment reducing additional thermal noise. Also, no signal amplifiers are needed between the proposed transducer and an optical sensor, which may be at room temperature. The proposed transducer is applicable to all kinds of microwave signals, such as from spins, superconducting circuits, cryogenically cooled quantum computers, quantum dots, etc.

The proposed transducer is configured to couple a microwave input signal and an optical input signal to allow the apparatus to generate one or more optical output signals which is/are proportional to the microwave input signal. The apparatus is able to implement this coupling very efficiently. In other words, the coupling efficiency for converting microwave photons into optical photons is very high. The conversion or coupling efficiency may be expressed as the ratio between the numbers of converted microwave photons and of detected optical photons. The proposed apparatus has also the advantage that the bandwidth of the apparatus is very high, which means that the incoming microwave signals may be spread over a large frequency bandwidth, and the apparatus would still be able to transduce microwave photons from these signals into optical photons.

According to a second aspect of the invention, there is provided a microwave signal detection system comprising the transducer according to the first aspect and further comprising a sensor as recited in claim 16.

According to a third aspect of the invention, there is provided a method of operating the microwave-to-optical photon transducer as recited in claim 17.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which:

FIGS. 4a to 4h are cross-sectional schematic views illustrating different configurations for the microwave and optical waveguides that may be used in the apparatus of FIG. 1;

FIGS. 5 and 6 are diagrams showing different example signals in the frequency domain that may be present in the apparatus of FIG. 1 in different application scenarios;

DETAILED DESCRIPTION OF AN EMBODIMENT OF THE INVENTION

Figure 1:
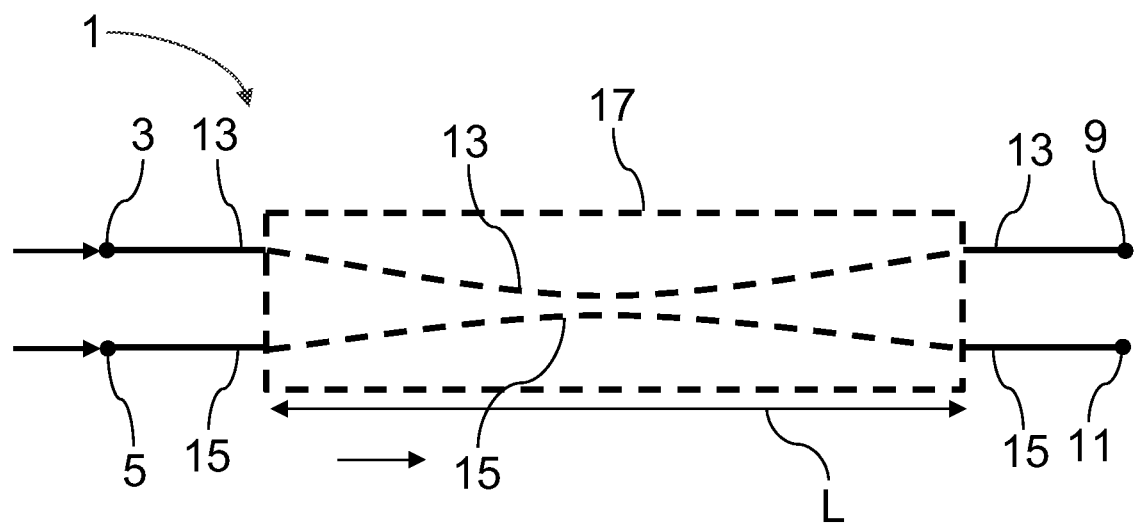
FIG. 1 schematically illustrates the proposed apparatus according to an example embodiment of the present invention.

Some embodiments of the present invention will now be described in detail with reference to the attached figures. The embodiments are described in the context of a transducer configured to transduce microwave input signals into one or more optical output signals, which may then be detected by an optical-domain sensor. The transduction between microwave and optical excitations would typically take place at millikelvin temperatures with sufficiently high efficiency. The proposed apparatus, thanks to its efficiency and bandwidth, opens new opportunities in sensing. However, it is to be noted that the teachings of the invention are not limited to this environment. Identical or corresponding functional and structural elements which appear in the different drawings are assigned the same reference numerals.

FIG. 1 schematically illustrates in a simplified manner the structure of an apparatus 1 for generating a coupling between a microwave signal and an optical signal. More specifically, in the below example embodiments, the apparatus thus operates as a microwave-to-optical photon converter or transducer. As explained later in more detail, the transducer 1 also features an amplification function. The transducer in the example of FIG. 1 comprises a first input terminal or port 3 and a second input terminal or port 5. In this example, the first input port 3 is configured to receive an optical pump signal or multiple optical pump signals, while the second input port 5 is configured to receive microwave signals. The number of photons in the optical pump signals is typically much higher than the number of photons in the microwave signals. In the present description, by microwave signals are understood signals which have their signal frequency in the microwave region, while by optical signals are understood signals which have their signal frequency in the optical region. The optical region of the electromagnetic (EM) spectrum refers approximately to the region with wavelengths between 100 nm (3 PHz frequency) and 1 mm (300 GHz) comprising the ultraviolet, visible, and infrared regions. It is to be noted that of particular interest is the near-infrared band used for fibre optic telecommunication, extending approximately from 1260 to 1675 nm, as well as the visible band, extending approximately from 390 to 780 nm. The microwave region of the EM spectrum refers approximately to the region with wavelengths between 1 mm (300 GHz) and 1 m (300 MHz).

As shown in FIG. 1, the transducer 1 also comprises a first output port 9 and a second output port 11. In this example, the first output port is configured to output optical signals, while the second output port is configured to output microwave signals. A first waveguide 13 is placed between the first input port 3 and the first output port 9. Thus, the first end of the first waveguide is coupled or connected to the first input port 3, while a second, opposite end of the first waveguide 13 is coupled or connected to the first output port 9. Thus, the first waveguide extends longitudinally between the first input port and the first output port. As the optical signals are arranged to propagate through the first waveguide, this waveguide is also referred to as an optical waveguide. A second waveguide 15 is placed between the second input port 5 and the second output port 11. Thus, the first end of the second waveguide is coupled or connected to the second input port 5, while a second, opposite end of the second waveguide 15 is coupled or connected to the second output port 11. Thus, the second waveguide extends longitudinally between the second input port and the second output port. As microwave signals are arranged to propagate through the second waveguide, this waveguide is also referred to as a microwave waveguide.

FIG. 1 also shows an interaction zone 17 with a length L, where the electromagnetic (EM) field generated by the microwave photons travelling inside the microwave waveguide 15 start to interact with the electromagnetic field generated by the optical photons travelling inside the optical waveguide. These two electromagnetic fields are coupled by a non-linear material present in the interaction zone as explained later in more detail. It is to be noted that the transducer 1 in this example is a cavity-less element, or at least the first waveguide and the second waveguide where the first electromagnetic field and the second electromagnetic field are arranged to interact are non-resonator elements. In other words, the transducer 1 in this example does not comprise any resonant structures, and it is thus a resonator-free apparatus. This means that only travelling waves, as opposed to resonant excitations, are present in the transducer when it is used.

Figure 2:
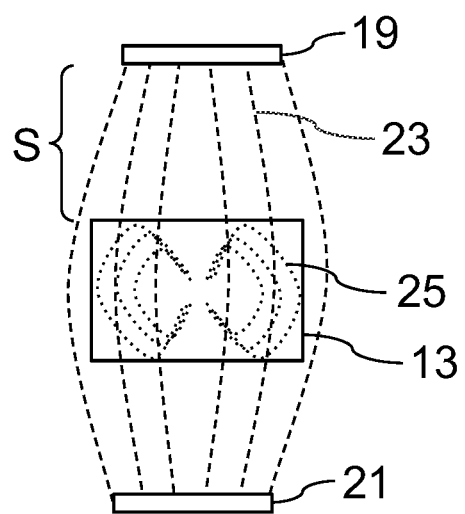
FIG. 2 is a cross-sectional view showing example microwave and optical waveguides that may be used in the apparatus of FIG. 1.
Figure 3:
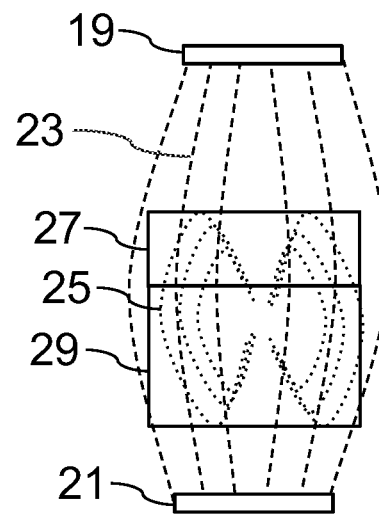
FIG. 3 is a cross-sectional view showing other example microwave and optical waveguides that may be used in the apparatus of FIG. 1.

FIGS. 2 and 3 are cross-sectional views showing two different configurations of the first and second waveguides 13, 15. The cross sections are taken along a plane which is orthogonal to the longitudinal axis of the waveguides. It is to be noted that in the example shown in FIG. 1, the longitudinal axes of the waveguides are curved axes. Referring to the waveguide configuration shown in FIG. 2, the second waveguide 15 comprises a first electrode 19 and a second electrode 21. Furthermore, a dielectric material, in this example a low-loss dielectric material, which may be air for instance, and which is placed between the first and second electrodes 19, 21 may also be considered to be part of the second waveguide 15. In this example, both of these electrodes are superconducting. Microwave signals are thus arranged to travel in the low-loss dielectric material by bouncing between the electrodes. The first waveguide 13 is in the configuration of FIG. 2 also placed between the two electrodes. In this example, the first waveguide 13 is made of the non-linear material, which may also be called an active medium. FIG. 2 also shows first electromagnetic field lines 23 and second electromagnetic field lines 25 (these field lines are shown as dashed lines in FIGS. 2 and 3). The first electromagnetic field lines visualise an electromagnetic field generated by the photon propagation inside the microwave waveguide 15, while the second electromagnetic field lines visualise an electromagnetic field generated by the photon propagation inside the optical waveguide 13. It is to be noted that the first and second electrodes do not have to be identical, although they may be identical. Furthermore, the electrodes may be of the same size or smaller or larger than the optical waveguide. One of the two electrodes may be directly grounded or indirectly grounded via a capacitor, an inductor or a resistor. Alternatively, both electrodes 19, 21 may be floating. Moreover, there is preferably a physical gap between the microwave waveguide 15 and the non-linear material. Otherwise the optical field propagation could degrade. The distance between the respective microwave waveguide and the non-linear material is in FIG. 2 denoted by S.

The arrangement of FIG. 3 is similar to the arrangement of FIG. 2, but with the main difference that the optical waveguide 13 comprises a non-linear component or element 27, which is formed by the non-linear material, and a linear component or element 29. Both the non-linear and linear components are dielectrics. In the example shown in FIG. 3, the non-linear component 27 is placed on top of the linear component 29, to be in direct contact with each other. However, many other alternative arrangements exist to build the composite optical waveguide 13. More specifically, the non-linear component 27 may be placed beneath the linear component 29, or they could be placed side by side. These kinds of arrangements have the advantage that there is no need to etch the non-linear material, which makes the fabrication simpler, but the interaction coupling is not as strong as in the configuration of FIG. 2, where the optical waveguide 13 is entirely or substantially entirely made of the non-linear material. It is also possible to build the optical waveguide so that the linear material would be entirely or substantially entirely encapsulated by the non-linear material apart from its longitudinal ends, i.e., when looking at the cross section of the optical waveguide, the linear material would be entirely or substantially entirely encapsulated by the non-linear material.

FIGS. 4a to 4h are cross-sectional views showing different configurations for the microwave waveguides 15 with respect to the optical waveguide 13. It is to be noted that in FIGS. 4a to 4h, the optical waveguide 13 may be entirely made of the non-linear material or it may be a composite waveguide composed of the non-linear and linear materials. As can be seen, the configurations of FIGS. 4b and 4f comprise a third electrode 22, which is also part of the microwave waveguide 15. Furthermore, in the configuration of FIG. 4f, all the three electrodes 19, 21, 22 are placed side by side on one side of the optical waveguide 13. It is to be noted that one, two or all of the electrodes of the microwave waveguide 15 may be connected to the second input port 5.

In operation, the apparatus 1 operates as a microwave-to-optical signal transducer, i.e., microwave photons incident on the second input port 5 are transduced into optical photons at the first output port 9. To achieve this, one or more optical pump signals are fed into the first input port 3, and configured properly as will be explained later in more detail. However, it is also possible to feed a microwave pump signal into the second input port 5. The apparatus 1 is designed to enable efficient interaction of propagating microwave and optical photons in the non-linear material. To achieve this, the microwave and optical signals propagating in their respective waveguides are phase-matched or quasi phase-matched. The interaction in the non-linear material is considered to be parametric, i.e., the interaction is activated by providing energy, originating for instance from one or more optical photon sources (e.g., LASERs) (not shown in the drawings), which are used to produce the optical pump signals. The parametric process is instantaneous, and the interaction strength is thereby enhanced by the flux of pump photons (i.e., the optical pump signals). Furthermore, since no high-quality factor resonators are used, the signal bandwidth can be made remarkably high. The output signals' frequencies are linearly related to the incident microwave signals' frequencies and the pump signals' frequencies. It is to be noted that in addition to providing at least one optical pump signal, a direct current (DC) electric field could also be provided. The field direction may be changed periodically to emulate periodic poling as explained later in more detail.

The simplest nonlinear interaction, which can take place in the transducer 1, is a three-wave mixing resulting in the generation of a sum frequency and a difference frequency. For the three-wave mixing implementation, at least one pump frequency or tone is required. Alternatively, a four-wave mixing, or higher order nonlinearity can be used with a greater number of pump tones (one of which may be a direct current (DC) voltage). Thus, at least two types of non-linear mediums may be used, namely a second order non-linear material for implementing three-wave mixing, and a third order non-linear material for implementing four-wave mixing. The interaction in the non-linear material is described by the following equations, where z is the axis of wave propagation (and shown in FIG. 1 by the arrows): $\partial_z a_a = -ig_0 a_p b - x_a^{-1} a_a$, and $\partial_z b = ig_0 a_p + a_a - x_m^{-1} b$. In the above equations:

i denotes the imaginary unity;

$g_0$ denotes the travelling wave vacuum coupling strength (this property depends on the material properties);

$a_a$ denotes the resulting photon-field envelope operator;

$a_p$ denotes the pump-photon field envelope operator;

$a_p^+$ denotes the conjugated pump-photon field envelope operator;

b denotes the microwave photon field envelope operator;

$x_a$ denotes the susceptibility of the resulting optical photon mode, which is an optical response function of the waveguide to an input photon; and $x_m$ denotes the susceptibility of the microwave photon mode, which is the microwave response function of the waveguide to an input photon.

Furthermore, $g_0$ is proportional to:

$$\Sigma_{z=1}^M \int_{D_z} \epsilon_{ik} \epsilon_{jl} r_{klm}^{(eff)} E_b^m(\omega_b) E_a^i(\omega_a) E_a^j(\omega_a) dD_z.$$

where $D_z$ is one of the M interaction domains, $\epsilon_{ik}$ is the permittivity tensor of the non-linear crystal, $E_b(\omega_b)$ is the electric field generated by the propagating microwave photons at the microwave frequency $\omega_b$, $E_a(\omega_a)$ is the electric field generated by the propagating optical photons at the optical frequency $\omega_a$, and $r_{klm}^{(eff)}$ is the tensor of the effective three-wave-mixing coefficients. Furthermore, i, j, k, l, and m are summation indices that take values 1, 2, and 3 (or alternatively x, y, z as they correspond to the components of the electric field vectors (projections to the coordinate axes) and the permittivity and the effective electro-optic tensors). Here we follow Einstein's summation convention, i.e. when an index variable appears twice in a single term and is not otherwise defined, it implies summation of that term over all the values of the index. $r_{klm}^{(eff)}$ is material-dependent and additionally pump-dependent (modified by the additional electric field of the optical pump signal). The goal is to maximise $g_0$ (the coupling strength of the non-linear interaction). One way to achieve this is to optimise the interaction of the electric fields by adjusting the geometry, configuration and spacing of the electrodes 19, 21, 22 of the microwave waveguide 15 with respect to the optical waveguide 13 so that the generated microwave and optical electric fields interact optimally with the non-linear atomic structure (maximising the tensor products in the above equation for $g_0$).

If a second-order non-linear material is used, then r-effective (i.e., $r_{klm}^{(eff)}$) is directly proportional to the electro-optical tensor of the material ($r_{klm}$). Furthermore, in this example, if a second-order non-linear material is used, then only one optical pump signal is necessary (in addition to the microwave signal). Any noncentrosymmetric optical crystalline material, or a combination of such materials, may be used for the second order non-linear material: for instance, $LiNbO_3$, GaP, $BaTiO_3$, $LiTaO_3$, $\beta$-$BaB_2O_4$, AlN, $LiB_3O_5$, $KTiOPO_4$, $KNbO_3$, $KH_2PO_4$, $LiIO_3$, $(NH_4)(H_2PO_4)$, CdSe, GaAs, InN, InSb, ZnTe, and $Pb[Zr_xTi_{1-x}]O_3$. If a third-order non-linear material is used, then r-effective is proportional to the third order non-linear tensor of the material ($x_{klmn}$) and a DC field or an additional pump signal (also called a "tone"). Thus, in this case, at least two energy sources would be needed, namely an optical pump signal and a DC electric field or an additional pump signal, either optical or microwave. In practice, the field $E_n$ is chosen as "DC" (i.e., $\omega_n$=0) when the aim is to avoid any parasitic mixing product. However, the difficulty is that a large DC voltage (a few tens of volts) would need to be applied.

Alternatively, in practice, the field $E_n$ is chosen as a microwave or optical pump tone ($\omega_n \neq 0$). The advantage over the DC configuration is that the required voltage will be lower than the one in the DC configuration. The techniques above enable controlling and increasing the "effective three-wave mixing" by using the additional field $E_n$. Any centrosymmetric optical crystalline material, or a combination of such materials, may be used for the third-order nonlinear material: for instance, $SiN_x$, $SiO_2$ (Quartz), $Al_2O_3$ (Sapphire), Si, $Gd_3Ga_5O_{12}$, Diamond, SiC, SiGe, $CaF_2$, $MgF_2$.

The present example embodiments feature one or more photonic band gaps, referred to simply as photonic gaps, to suppress unwanted output frequencies. A photonic gap is a range of frequencies in a material forbidden for optical fields. One or more photonic gaps (typically more than one photonic gap) may be generated by engineered structures of the material with periodic spatial distributions. Thus, a photonic gap may be understood to arise from a "photonic lattice" with feature dimensions of the same order as the optical photon wavelength. Non-linear interaction usually results in multiple output frequencies (mixing products). To suppress the generation of unwanted mixing products, the optical waveguide 13 is periodically structured so that the unwanted frequency or frequencies fall into a photonic gap or gaps. The dimension of the periodic structure of the waveguide is commensurate with the optical wavelength (which in this example is approximately 1.5 μm).

The diagram of FIG. 5 schematically illustrates some of the signals that are present in the transducer 1 according to the first embodiment, where an optical input pump signal $S_{pi\_in1}$ is fed into the first input port 3, and a microwave input signal $S_{in2}$ is fed into the second input port 5. In the diagrams of FIGS. 5 and 6, the x-axis represents the signal frequency, while the y-axis represents the number of photons. Furthermore, in FIG. 5, $\Omega_1$ denotes the signal frequency of the microwave signal (input and/or output signal), which in this example propagates through the microwave waveguide 15. In this scenario, a microwave input signal $S_{in2}$ at the second input port 5, and a microwave output signal $S_{out2}$ at the second output port 11 have substantially the same frequency $\Omega_1$. The microwave input signal $S_{in2}$ and the microwave output signal $S_{out2}$ are in fact considered the same microwave signal, but the signal power at the output is not the same as at the input. The frequency of the optical input pump signal $S_{pi\_in1}$ and the optical output pump signal $S_{pi\_out1}$ is denoted by $\Omega_{pi}$, while the frequency of the optical output non-pump signal (the idler signal) is denoted by $\Omega_2$. Here again, the optical input pump signal $S_{pi\_in1}$ and the optical output pump signal $S_{pi\_out1}$ are in fact considered the same optical signal, but the signal power at the output is not the same as at the input. As mentioned above, if the second order nonlinear medium is used in the interaction apparatus, then only one pump signal is needed. The output signal at the first output port 9 comprises a first output signal component, namely an optical output pump signal $S_{pi\_out1}$ but having fewer photons than the optical input pump signal $S_{pi\_in1}$ but substantially the same frequency $\Omega_{pi}$, and a mixed signal or an optical output non-pump signal $S_{out1}$, which is a difference-frequency signal, or a lower-sideband signal, resulting from the signal mixing of the input signals. The frequency of the lower-sideband signal $S_{out1}$ is $\Omega_2$, where $\Omega_2$ is proportional to $\Sigma a_i \Omega_{pi} - \beta \Omega_1$, where coefficients $a_i$ (where i may take values from 1 to N) and $\beta$ are real numbers. In the scenario of FIG. 5, the number of photons in the microwave output signal $S_{out2}$ approximately equals the sum of the number of photons in the microwave input $S_{in2}$ signal and the number of photons in the lower-sideband signal $S_{out1}$, i.e. $S_{out2} = S_{in2} + S_{out1}$.

The lower-sideband signal, also called an idler or idler signal according to the terminology used to describe a parametric amplification process, is the desired output signal in the above scenario, and as shown in FIG. 5, its frequency lies in the optical frequency domain. As explained above, in order to optimise the strength of the signal, a photonic gap is used (which defines a forbidden frequency domain). FIG. 5 also shows the location of the photonic gap in the frequency domain. Any optical signal with its frequency within this gap, such as any undesired upper sideband frequencies resulting from the mixing of the input signals, is thus suppressed. It is to be noted that the number of photons contained in the signals is not necessarily drawn to scale, i.e., the proportions are not necessarily correct. Furthermore, the frequency axis is discontinuous as the microwave frequencies are smaller than the optical frequencies by orders of magnitude. It is also to be noted that the number of photons contained in the pump signals is much higher (e.g. a few orders of magnitude, in practice, the pump can have more than 16 orders of magnitude larger photon number than the signal) than in the other non-pump signals shown in FIG. 5, and to represent this, the pump signals are drawn with dashed lines.

The process illustrated in the diagram of FIG. 5 is a non-degenerate parametric amplification process. This means that the amplification of signals at frequency $\Omega_1$ uses energy from the externally applied optical input pump signal $S_{pi\_in1}$ at the frequency of $\Omega_2+\Omega_1$ (i.e. the idler frequency+ microwave signal frequency). As mentioned above, the idler tone is designed to be in the optical domain. In this scenario, the amplification of the microwave input signal and the generation of the idler signal happen simultaneously along the optical waveguide 13 in the non-linear material.

In practice, the optical pump frequency $\Omega_{pi}$ is chosen based on the microwave input signal frequency $\Omega_1$ and on the desired idler frequency $\Omega_2$ (which is preferably within the detection range of an optical photon detector that is placed after the transducer 1). The optical pump frequency $\Omega_{pi}$ can thus be defined using equation $\Omega_{pi}=\Omega_1+\Omega_2 \Leftrightarrow \Omega_2=\Omega_{pi}-\Omega_1$. The maximum output power of the idler signal in the linear amplification regime can be limited by the parametric instability of the microwave mode (which can be triggered if the input pump signal power is too high). It is to be noted that the idler frequency is a byproduct of the parametric amplification process. This byproduct is typically unwanted in existing applications, but it is used according to the present invention to detect the microwave input signals, and more precisely the number of photons or the energy of those signals, as the amplified microwave input signal is transduced to the optical domain. The idler signal $S_{out1}$ can then be sensed by a photodetector sensor 53 (as shown e.g. in FIG. 8) connected to the first output port 9. As the idler signal $S_{out1}$ is proportional to the microwave input signal, detecting the idler signal allows also the detection of the power of the microwave input signal. Examples of possible sensors are an avalanche photodiode, a single-photon avalanche diode, a photodiode, a nanowire photodetector, and a bolometer. In the scenario of FIG. 5, the upper-sideband signal is suppressed, but it could be possible to suppress the lower-sideband signal instead and keep the upper-sideband signal. However, this way of operating the transducer would not lead to an amplification process. Hence it would be more difficult to detect the upper-sideband signal with a commercial photodetector. In other words, a more expensive photodetector would be needed and/or the detection operation would be less efficient.

The present invention according to the first embodiment is thus based on the idea of using the lower-sideband signal $S_{out1}$ (the idler signal) to detect the original microwave input signal $S_{in2}$. Furthermore, the process uses travelling waves for mixing the optical pump and microwave signals. By contrast, known solutions use resonant oscillations. It is to be noted that before detecting the idler, it is beneficial to first filter out the optical output pump signal $S_{pi\_out1}$. For this purpose, an optical bandpass filter may be used, or the idler signal propagation direction may be made different from the optical pump signal propagation direction to separate the waves in space. If this operation is not carried out, then the idler signal could be hard to resolve next to the optical pump signal at the detector 53. Furthermore, a second photonic gap may also be generated, which would be approximately at a frequency equalling twice the optical pump frequency $\Omega_{pi}$. This would suppress the generation of photons within a frequency range approximately from $2\times(\Omega_{pi}-\Omega_1)$ to $2\times(\Omega_{pi}+\Omega_1)$. Generating the second photonic gap is not required but generating it would be advantageous as the efficiency would increase. More specifically, the second photonic gap prevents loss of photons from the idler signal to a higher frequency (such that it would not be detected after the transduction).

The diagram of FIG. 6 schematically illustrates some of the signals that are present in the transducer 1 according to a second embodiment. In this case, the same input signals as in the first embodiment of FIG. 5 (but not necessarily having the same number of photons as in the first embodiment illustrated in FIG. 5) are applied to the transducer 1, but no photonic gap is used to suppress any of the sideband or idler signals. However, also in this scenario a photonic gap may or may not be present at a frequency, which is equal to twice the optical pump frequency $\Omega_{pi}$. Thus, in this scenario, at the first output port 9, three signals are present, namely the optical output pump signal $S_{pi\_out1}$, a lower-sideband signal $S_{out11}$, or a first (lower-frequency) idler signal, and an upper-sideband signal $S_{out12}$, or a second (upper-frequency) idler signal. The frequency of the lower-sideband signal is denoted by $\Omega_{21}$ while the frequency of the upper-sideband signal is denoted by $\Omega_{22}$. The process illustrated in the diagram of FIG. 6 is a non-degenerate parametric amplification process and a frequency up-conversion of microwave photons. This means that the amplification process uses the externally applied optical input pump signal $S_{pi\_in1}$ at the frequency of $\Omega_{21}+\Omega_1$ (i.e. the first idler frequency+microwave signal frequency) that provides energy for the amplification. The rate of amplification is the same as the rate of up-conversion of the microwave photons into optical photons. More specifically, in the transducer 1, microwave photons are generated by parametric amplification at the same rate as microwave photons are up-converted to the upper-sideband signal. Thus, at the output of the transducer, the microwave input signal $S_{in2}$ is not amplified by the process. This means that the number of photons in the microwave output signal $S_{out2}$ is lower than the number of photons in the microwave input signal $S_{in2}$ because of the propagation loss in the microwave waveguide 13. The frequencies of the two optical idler signals can be obtained as follows: $\Omega_{21}=\Omega_{pi}-\Omega_1$ and $\Omega_{22}=\Omega_{pi}+\Omega_1$. The power of these two idler signals can be very high (limited to a certain fraction of the pump power). It is then possible to filter one of the idler signals after the apparatus 1, process them optically in a different way, or just send them both to the sensor 53. Both of the output non-pump signals or just one of them can then be sensed by the photodetector sensor connected to the first output port 9. Examples of possible sensors are an avalanche photodiode, a single-photon avalanche diode, a photodiode, a nanowire photodetector, and a bolometer. It is to be noted that in the above examples, the input signals, or at least some of them, are applied to the apparatus simultaneously. Furthermore, the apparatus may be reversible. In other words, input signals may be applied to the apparatus from either end of the apparatus (output signals would then be present at the opposite end).

The second embodiment is thus based on the idea of using the combined process of amplification and up-conversion to detect the original microwave input signal $S_{in2}$ without affecting the microwave input signal itself (except for the propagation loss in the apparatus). According to the scenario of FIG. 6, there are two concurrent processes (i.e. taking place simultaneously) in the transducer. More specifically, at each portion of the non-linear material, microwave photons are amplified (with the optical idler generation in the lower sideband) and/or upconverted to the optical frequency range (to the upper sideband). For example, if we have one input microwave photon that is amplified by a factor of 2 in a first length portion of the optical waveguide, then we have two photons in the microwave mode, one idler photon in the lower sideband, and zero photons in the upper sideband. Then one of those two microwave photons is upconverted to the upper sideband in a second length portion. In this case we have one microwave photon, one idler photon in the lower sideband, and one photon in the upper sideband. After N number of steps like that we will have one or two microwave photons and about N optical photons in each of the two sidebands. This means that at the transducer output, the input microwave signal is not amplified. Furthermore, the process uses travelling waves mode for mixing the optical pump and microwave signals. By contrast, known solutions use resonant oscillations. It is to be noted that before detecting the idler signal, it is beneficial to first filter out the optical output pump signal $S_{pi\_out1}$. For this purpose, an optical bandpass filter may be used, or the idler signal propagation direction may be made different from the optical pump signal propagation direction to separate the waves in space. If this operation is not carried out, then the idler signal could be hard to resolve next to the optical pump signal at the detector 53.

Figure 7:
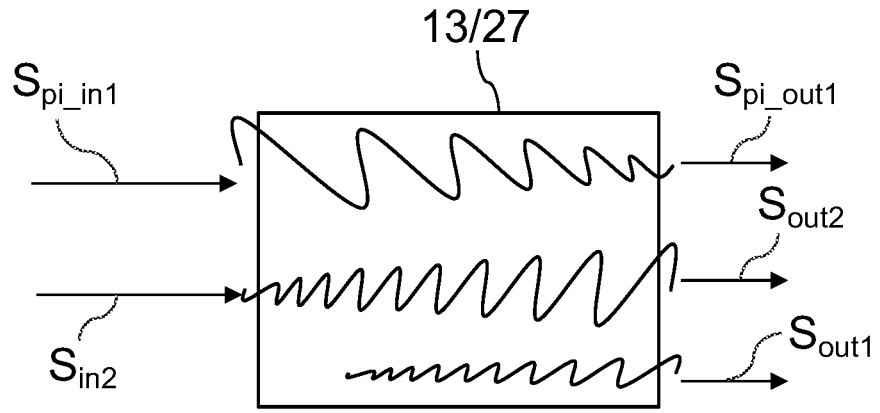
FIG. 7 illustrates the possible signal waveforms in a non-linear material of the apparatus of FIG. 1.

FIG. 7 schematically shows how the signal waveforms evolve within the non-linear medium 13, 27 and how the idler signal is generated during parametric amplification in the scenario of FIG. 5. As can be seen, the optical input pump signal $S_{pi\_in1}$ is diminished within the non-linear medium. In other words, the optical output pump signal $S_{pi\_out1}$ has less energy, i.e. a smaller number of photons compared with the optical input pump signal $S_{pi\_in1}$. Furthermore, the optical input pump signal has many more photons than the microwave input signal $S_{in2}$. As can also be seen in FIG. 7, the microwave signal is amplified when travelling through the microwave waveguide 15, which means that its number of photons is increased. The idler signal, which is in the optical domain, is the mixing product of the optical and microwave signals. It is to be noted that there is one idler photon per one additional microwave photon when the microwave signal is amplified between the microwave input port 5 and the microwave output port in the non-linear material in the transducer 1. When a signal is amplified, photons are added to the signal at its signal frequency. Thus, when a microwave input signal with one photon is amplified by 20 db (×100) between the input and output ports, we obtain 100 microwave photons at the output and 99 idler photons at the idler frequency optical frequency $\Omega_2$. The solution according to the present invention does not use the amplified microwave signal per se, but the idler signal is used instead to indirectly detect the microwave input signal. The idler signal is only generated as a result of the parametric amplification process. The idler signal is generated by the interaction of the microwave signal, the pump signal and the non-linear medium (ideally a material having a second order non-linearity). However, as mentioned above, a third-order non-linear material may also be used by combination of multiple pump signals (optical and/or microwave and/or DC current).

Figure 8:
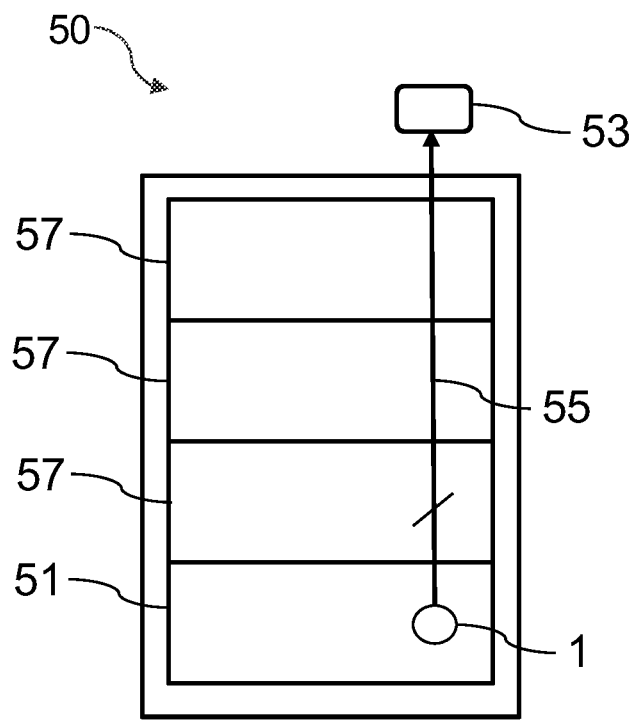
FIG. 8 schematically illustrates a microwave signal detection arrangement.

FIG. 8 schematically illustrates microwave signal detection system 50 or an environment, where the teachings of the present invention may be applied. In this example, the apparatus 1, which thus operates as a microwave-to-optical photon transducer, is placed in a cryogenic environment. More specifically, the apparatus is placed in a cryogenic chamber 51, which may have a temperature below −200° C. The cryogenic chamber also accommodates a microwave stage including microwave circuits, which are coupled to the transducer 1. The transducer 1 is connected to the sensor 53, which is configured to measure the arrival of optical photons, via an optical channel 55 and so that the optical channel passes through different temperature chambers 57 at different temperatures so that the temperature gradually increases from the transducer 1 towards the sensor 53. The transducer 1 is configured to transduce the microwave input signal into the optical domain as the idler signal(s), which travel(s) through the optical channel to the sensor to be optically read. The example of FIG. 8 merely shows three temperature chambers 57, but the number of chambers is not limited to three. In this example, the sensor 53 is an optical photodetector, which in this example is at room temperature, although the detector temperature can differ from the room temperature. Furthermore, in this example, a voltage signal is obtained at the output of the photodetector 53, where the voltage signal is proportional to the microwave power incident on the input of the transducer.

Figure 9:
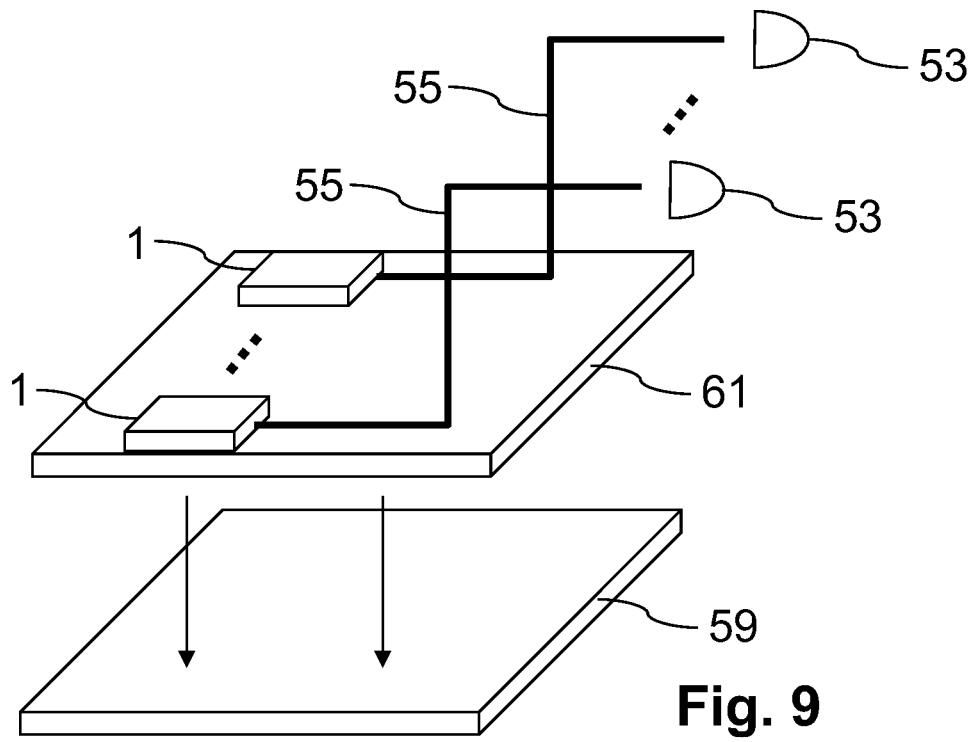
FIG. 9 illustrates a stacked configuration of a microwave circuit unit and a set of apparatuses.
Figure 10:
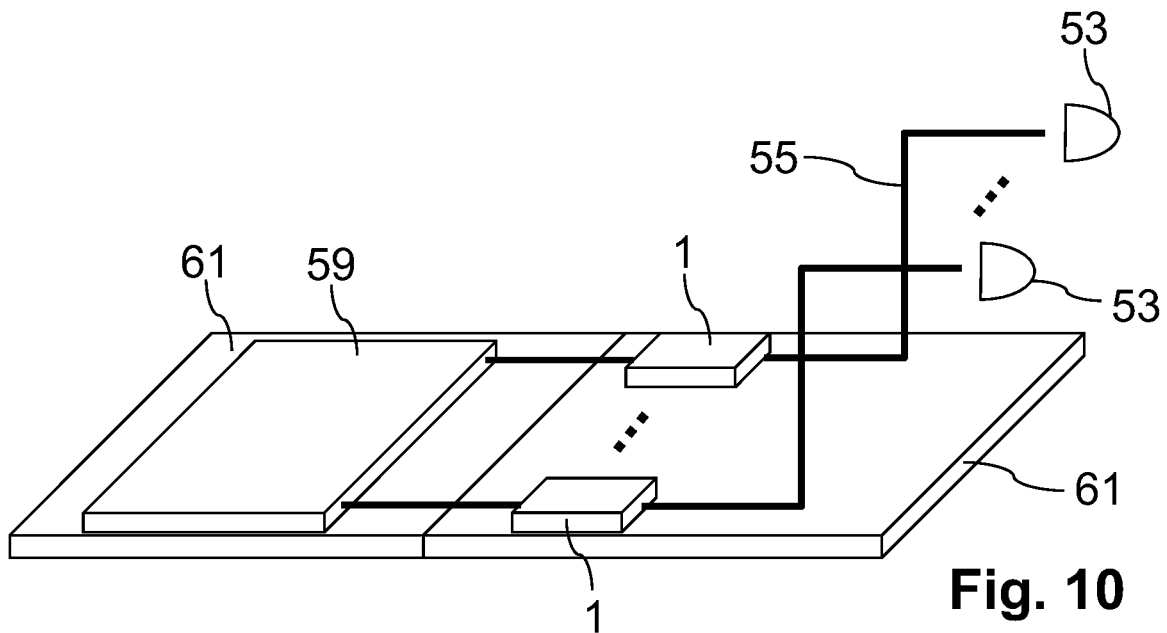
FIG. 10 illustrates a single-layer configuration of a microwave circuit unit and a set of apparatuses.

FIG. 9 schematically shows a stacked arrangement of a microwave circuit unit 59 and a set of transducers 1, while FIG. 10 schematically shows a single-layer arrangement of the microwave circuit unit 59 and the set of transducers 1. The set of transducers in this example comprises a plurality of transducers 1. As shown, the set of transducers 1 and the microwave circuit unit 59 are placed on a housing or support 61. There are many possible ways to couple the microwave circuits to the transducers, such as by using: direct wire-bonding; same chip fabrication; other known electronics assembly, including flip chip, or through wafer vias; and coupled waveguide. Using the coupled waveguide connection would involve placing the microwave circuit output waveguide next to the transducer microwave waveguide 15, by using a near-field connection, which is a capacitive and/or inductive coupling. The signal or wave would then switch from one waveguide to the other one (in a technique known also as an interaction coupler). The shorter the distance between the microwave circuits and the transducers 1, the lower the signal loss there will be at the inputs of the transducers. Regarding the entire system architecture, an antenna (not shown in the drawings) may be provided for receiving wireless signals. The antenna may then be coupled to the microwave circuits (which may e.g. do signal filtering), which are further connected to the sensors 53 through the optical channels 55. This kind of system architecture could be used for instance in radar applications or medical imaging, such as in magnetic resonance imaging (MRI). It is to be noted that in some applications, the antenna may be omitted. In these cases, the microwave circuits may be used to generate microwave photons which are then fed into the transducers 1. The system, such as shown in FIGS. 9 and 10 is also usable to connect a classical central processing unit (CPU) and a quantum co-processor within a quantum accelerator.

Figure 11A:
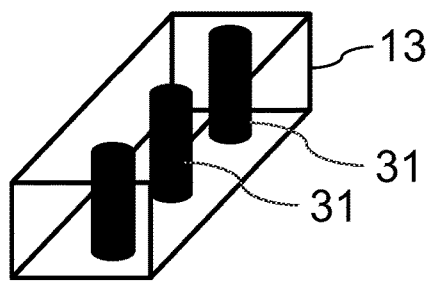
FIGS. 11a to 11e schematically illustrate different arrangements for creating a photonic band gap in the apparatus of FIG. 1.
Figure 11B:
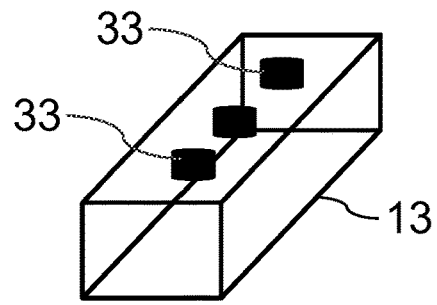
Figure 11C:
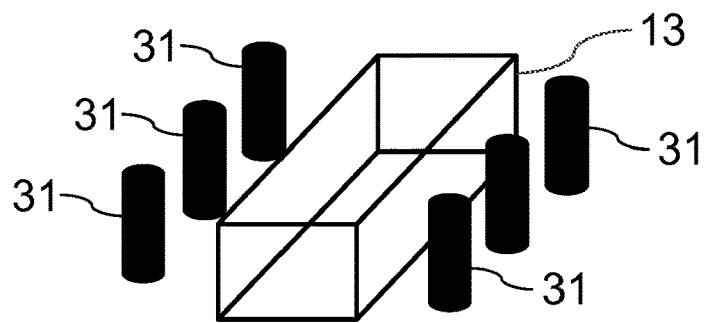
Figure 11D:
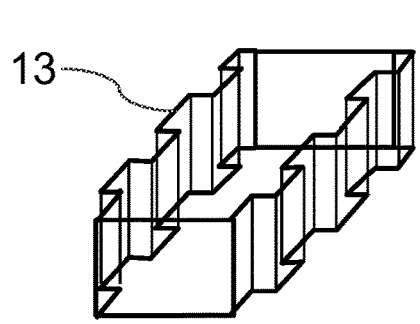

Various ways are available to create the photonic gaps as explained next. For instance, as shown in FIG. 11a, the photonic gap can be created by having holes 31, which are repeated periodically, and which may be through holes or blind holes, in the optical waveguide 13. The cross section of the holes may be in various shapes (even within a single waveguide), but they should be repeated periodically. However, ideally the holes have the same form factor (width/length/thickness) to obtain a perfect photonic gap. If the optical waveguide 13 comprises both the non-linear and linear components 27, 29, then the holes are advantageously made in the linear component 29. However, it would be possible to make them instead (or in addition) in the non-linear component 27. Thus, in the configuration of FIG. 11a, the periodic structure is formed by the holes 31. FIG. 11b illustrates another example of the periodic structure, which in this example is placed on the surface of the optical waveguide 13. The periodic structure is in this example made of blocks or patches 33, which may be of different material than the non-linear and/or linear material of the optical waveguide 13. For example, the material of the periodic structure could have a higher or lower refractive index than that of the non-linear material of the optical waveguide 13, which may be for instance made of any material mentioned above, such as silicon. The periodic structure can have any shape, as long as the added structure is periodic. Advantageously, the optical waveguide would have the periodic structure on one or more of its outer surface(s) along the entire, or substantially entire, length of the optical waveguide 13. Yet another way of implementing the photonic gap is to create periodic holes 31 outside of the optical waveguide 13, but in its proximity, as shown in FIG. 11c. This configuration would be feasible, if the dielectric around the optical waveguide is made of solid material. This would change the apparent effective refractive index of the material of the optical waveguide 13. Here again, the holes may be through holes or blind holes and having any desired cross section, as long as the holes are arranged periodically. In the example of FIG. 11d, periodic change of the cross section of the waveguide is used to create different effective refractive indices. The periodic changes may be obtained by corrugations, for example. This configuration is equivalent to having holes on the outer part of the waveguide.

Figure 11E:
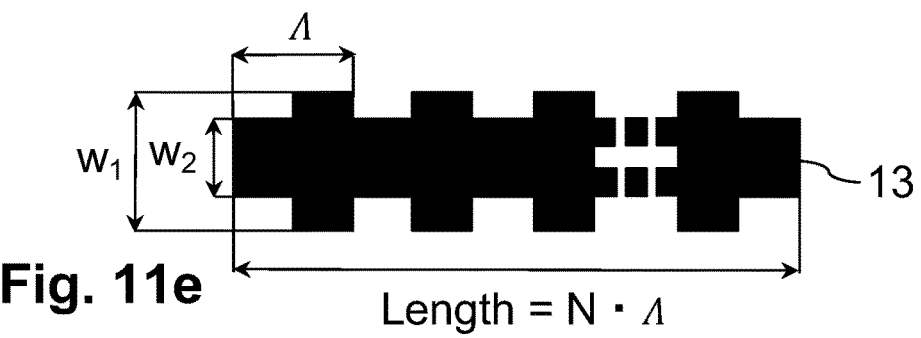

FIG. 11e shows a top view of the integrated optical component of FIG. 11d for highly effective frequency suppression application to operate as a frequency suppression filter. The component works by preventing the generation of optical signals at the undesired frequency (also called the Bragg frequency) inside the optical waveguide. The general idea of this component is based on a waveguide which exhibits periodically alternating geometry as presented in FIGS. 11a to 11d. The Bragg frequency may be adjusted by changing the width of waveguide corrugation (first or greater cross-sectional width $w_1$, and a second or smaller cross-sectional width $w_2$ as shown in FIG. 11e) and its periodicity Λ.

The effectiveness of the presented component is measured by its sharpness function Sf that we define as a difference in the frequency domain between points that give reflection values equal to 95% and 5% ($\delta f = f(R95\%) - f(R5\%)$, where R denotes reflection). The photonic (or optical) component we present here shows a high effectiveness as it is able to achieve $\delta f < \Omega_1$; where $\Omega_1$ is the frequency of the microwave input signal.

To achieve better sharpness (i.e. low values of δf), it is necessary to have the structure (i.e. the waveguide) as long as possible, i.e. N>>1, where N is the number of corrugations or periodic elements, because the value of δf decreases rapidly as a power law of $N^{-3}$.

The preferred mode of operation for the optical waveguide is using TE0 mode, since the existing fabrication constraints give a higher degree of freedom to vary $n_{eff1}$, $n_{eff2}$ by alternating $w_1$ and $w_2$. It is to be noted that TE0 is a term used to describe the orientation of the electric field inside waveguides. TE0 means that: a) the electric field is oscillating horizontally inside the waveguide cross section (TE); and b) the electric field amplitude distribution is one cosine function with maximum value at the centre of the waveguide cross-section (TE0). $n_{eff1}$ and $n_{eff2}$ are the effective refractive indices of the waveguide due to the corrugated geometry with widths $w_1$ and $w_2$. We use periodic corrugations to obtain periodic values of $n_{eff1}$, $n_{eff2}$ to obtain photonic gaps as described above. Moreover, it is also preferable to have a large difference $w = w_1 - w_2$ as this also translates to a large difference in effective refractive indices $\Delta n = n_{eff1} - n_{eff2}$. A larger value of Δn results in a larger sharpness (i.e. lower δf).

However, a certain balance needs to be ensured: $w_1$ may only be increased up to the point where the waveguide starts operating in a multiple-mode regime. This multimode-regime point is defined by the chosen input wavelength λ, its polarisation, the waveguide geometry (width and thickness) and the material. Therefore, in order to avoid reaching the multimode-regime point, one has to decrease the waveguide thickness, its width and its numerical aperture, and to increase λ. The numerical aperture (NA) is defined as the range of angles of optical propagation that an optical component can accept. The NA is proportional to the difference in the refractive indices of a waveguide's core and of its cladding. The NA may be decreased by choosing a cladding material that would have its refractive index value close to but not higher than the waveguide refractive index. The same criterion applies to $w_2$. However, as for $w_2$, it may not be set to be too low as the mode would not be guided any more. The width limits are set to be roughly between $w_{min} \sim \lambda/5$ and $w_{max} \sim \lambda/1.5$. These boundaries ensure that, on the one hand, the mode is confined and propagating within the waveguide, and on the other hand, the single TE0 mode regime is preserved. Furthermore, the waveguide has to be designed to avoid the band-gap closure effect which causes the filtering effect to vanish. This occurs approximately when $w_1 - w_2 \sim \Lambda/3$. The photonic crystal waveguide presented here has the advantage that its filtering bandwidth can be as low as the microwave frequency $\Omega_1$. Possible value ranges for some of the above parameters are given below.

Ranges of N:
  Extended range: 10<N<100,000;
  Acceptable N range: 100<N<100,000; and
  Ideal N range: 1000<N<100,000 (At N=1000, 5-95% sharpness is approximately δf=GHz which is considered as above average performance.)

Ranges of width:
  Extended range: 300 nm<$w_2$<600 nm, 800 nm<$w_1$<1200 nm;
  Acceptable range: 400 nm<$w_2$<600 nm, 800 nm<$w_1$<1000 nm; and
  Ideal range: 500 nm<$w_2$<600 nm, 800 nm<$w_1$<900 nm.

Ranges of Δn:
  Extended range: 0.001<Δn<2;
  Acceptable range: 0.01<Δn<2; and
  Ideal range: 0.1<Δn<2.

For all the example designs shown in FIGS. 11a to 11e, the distance between the periodic patterns in the structure defines the location and the size of the photonic gap. The position of the photonic gap in the frequency domain is inversely proportional to the period of the structure. With such a periodic structure, which thus typically generates a plurality of photonic gaps at different frequencies, the optical waveguide 15 is called a non-linear photonic crystal.

Figure 12:
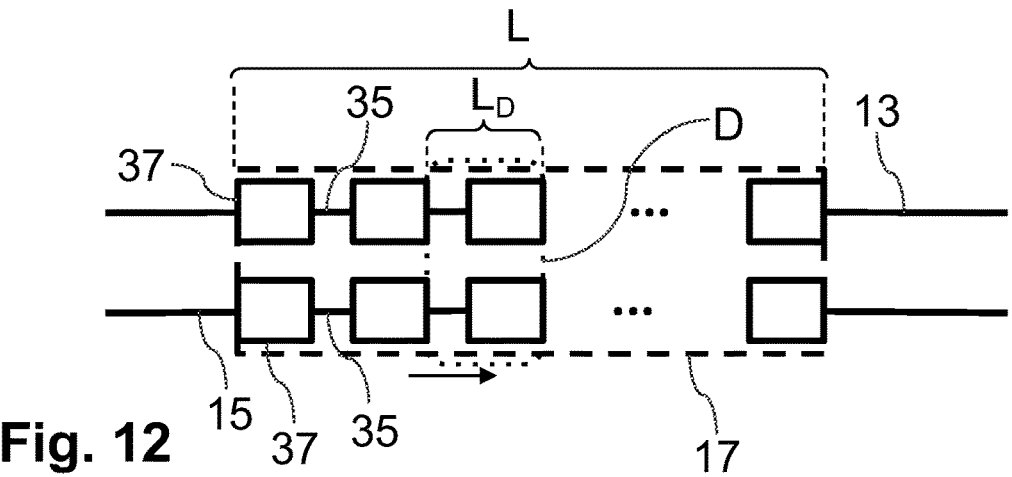
FIG. 12 schematically illustrates a phase-matching arrangement that may be used in the apparatus of FIG. 1.

To ensure that the travelling microwave and optical waves can interact efficiently (i.e., the waves' group velocities are nearly matched), and that the interaction resulting from different sections of the waveguides 13, 15 are added constructively, periodic alterations are introduced into the optical waveguide 13 and/or the microwave waveguide 15. Possible alterations include, but are not limited to, any one of the following, and combinations thereof: delay lines (may be applied to any one or both of the microwave and optical waveguides), coupled resonators (may be applied to the microwave waveguide), local modifications of the waveguide geometries (may be applied to any one or both of the microwave and optical waveguides), local modifications of the coupling coefficients (may be applied to any one or both of the microwave and optical waveguides), local modifications of the refractive index (may be applied to any one or both of the microwave and optical waveguides), and periodically poled structure (may be applied to the optical waveguide). It is to be noted that the alteration "local modifications of the coupling coefficients" represents a generalisation of the periodically poled structure. The idea is to locally change the effective electro-optic tensor r. The phase-matching methods may be used to improve the synchronisation of the microwave and optical signals as explained later in more detail. The periodic alterations are schematically illustrated in FIG. 12. As can be seen, in this example, both the optical and microwave waveguides 13, 15 are divided into two kinds of segments, the first are referred to as interaction segments 35, and the second are referred to as alteration segments 37. The combination of an interaction segment and an adjacent alteration segment forms a domain D. The length of the domain Lo is ideally the same for both the optical and microwave waveguides 13, 15. In an alteration segment 37, the interaction is altered, while no alteration takes place in an interaction segment 35. It is to be noted that the interaction takes place along the entire length of the interaction zone L. In this example, the domains are periodically arranged with no spacing between them as shown in FIG. 12, with the length of the period corresponding to $L_D$, where $L_D = \alpha \times \lambda/4$, where $\alpha$ is a positive integer and $\lambda$ is the wavelength of the microwave input signal $S_{in2}$. In other words, the domain length is a multiple of a quarter of the microwave wavelength. The overall structure of the combined domains is designed to achieve phase-matching or quasi-phase-matching (QPM) along the interaction length L. Quasi-phase-matching is a term related to achieving a similar result as true phase-matching (i.e. the coherent interference at the output of the conversion results from different sections of the proposed device) using a periodic structure to cancel the conversion where it produces the negative effect on the output (or to change the sign of the conversion locally to make a section to provide a positive contribution to the output). The true phase-matching implies that the conversion happens everywhere and the sign of the conversion is not altered. The difference between the true phase-matching and the quasi-phase-matching is not in the performance but in the structure used.

Figure 13:
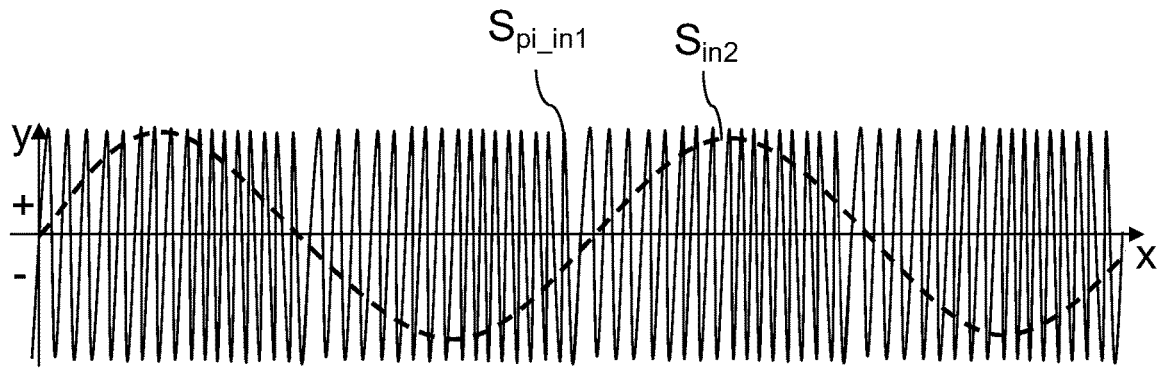
FIG. 13 shows example microwave and optical waveforms in the time domain.
Figure 14:
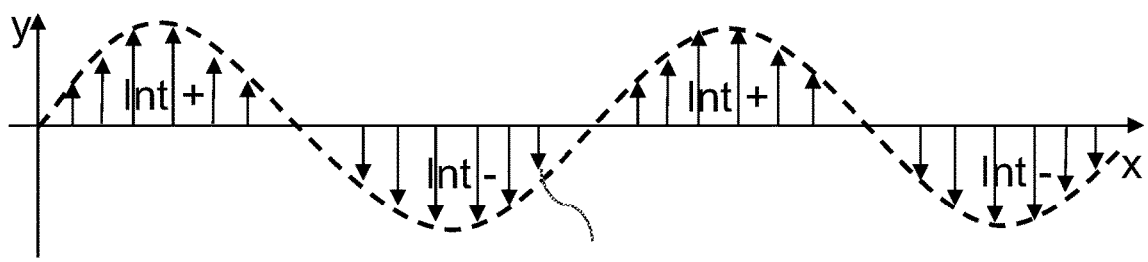
FIG. 14 illustrates how the signals of FIG. 13 may be integrated without carrying out phase-matching.

Before describing some of the alteration options in more detail, it is first illustrated with reference to FIGS. 13 and 14 why it is beneficial to implement the phase-matching in the transducer 1. FIG. 13 shows example microwave and optical signals in the time domain, while FIG. 14 shows the result of integrating these signals. The y-axis in FIGS. 13 and 14 represents the signal amplitude while the x-axis represents the propagation distance along the waveguide. $g_0$ denotes the sum of the integral over the interaction and alteration zones, in other words the sum of the multiplication of the microwave and optical signal levels over one domain D. As shown in FIG. 14, if no phase-matching is carried out, then the integrals would be about 50% of the time positive (when the microwave electric field would be positive) and about 50% of the time negative (when the microwave electric field would be negative), and the end result over the entire domain D (i.e. interaction and alteration zone) would be approximately 0, i.e., $g_0=0$. This means that there would either not be any interaction or that the amount of the interaction would be very small. To have a non-zero integration result, phase-matching is advantageously used.

Figure 15:
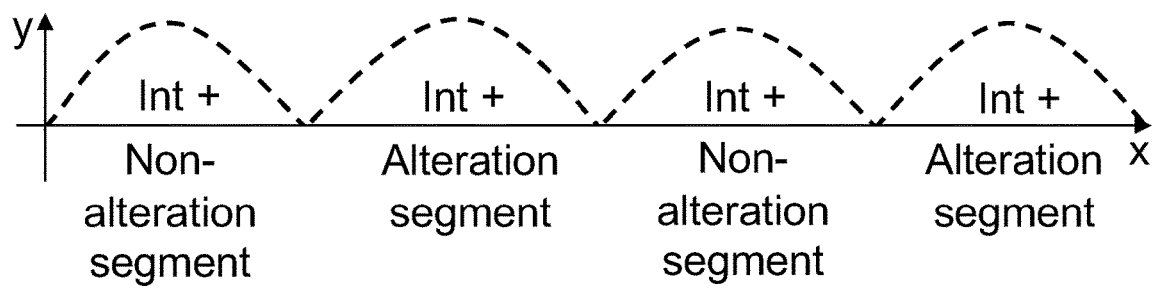
FIG. 15 illustrates how the signals of FIG. 13 may be integrated when applying phase-matching according to a first example.

The periodically poled structure in the non-linear material may for instance be obtained by applying high voltage for a given time duration in the desired locations in the non-linear material or by changing the temperature locally in the desired locations. In this manner, a change of the sign of the electro-optic coefficient (or material tensor) can be obtained in the desired locations in the non-linear material along the propagation axis of the material. More specifically, in this way, the sign of the electro-optic coefficient can be periodically alternated along the propagation axis of the material. As a result, as shown in FIG. 15 (where the x-axis represents the time while the y-axis represents the amplitude), the sum of the integral of the resulting signal will not be zero, thus leading to the desired interaction. This can be explained by the fact that for a non-linear material, $g_0$ is proportional to the sum of the integral of $\int_D \epsilon_{Lk} \epsilon_{ji} r_{klm}^{(eff)} E_b^m(\omega_b) E_a^i(\omega_a) E_a^j(\omega_a) dD$, but since the microwave signal is sinusoidal, $E_b$ is positive on one half of the domain D and negative on the other half. Then by using an adequately periodically poled structure, the $r_{klm}$ tensor becomes negative for the part of the domain where $E_b^m$ is negative, thus resulting in a non-zero integral.

Figure 16:
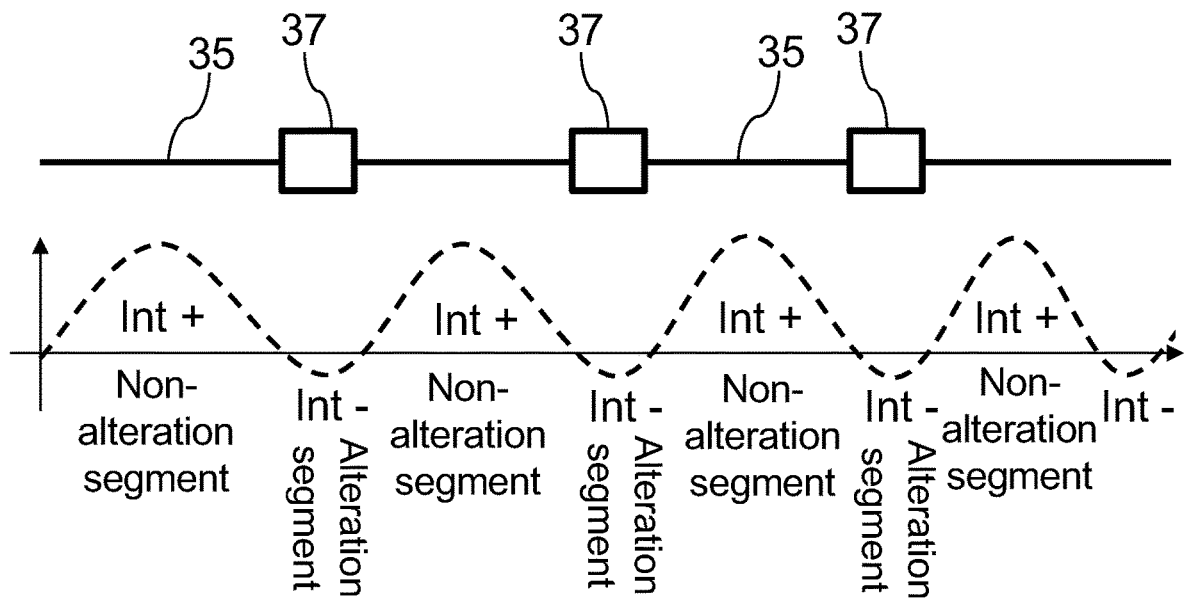
FIG. 16 illustrates how the signals of FIG. 13 may be integrated when applying phase-matching according to a second example.

If the geometry of a waveguide is modified, then this can be implemented by for instance modifying the shape of the waveguide to change the coupling strength of the electro-optics interaction. For example, typically for reducing the interaction, the respective waveguide should be made larger, and for increasing the interaction, the waveguide should be made smaller. It is to be noted that the electro-optic tensor is the material property describing the interaction between microwave signals and optical signals. FIG. 16 illustrates a situation where the microwave and optical waveguide geometries have been changed (the x-axis again representing the propagation distance along the waveguide, and the y-axis representing the signal amplitude). As a result, the sum of the integral of the resulting signal will not be zero, thus leading to the desired interaction. This is achieved so that the positioning (i.e., the distance) and/or the size and/or shape of the microwave and optical waveguides is/are designed so that for one of the microwave signal alternance (negative in FIG. 16) there is minimal coupling strength of the electro-optics interaction in the non-linear material. In practice, for example, the waveguides will lie closer and further away from each other at a periodicity close to the wavelength of the microwave signal.

Figure 17:
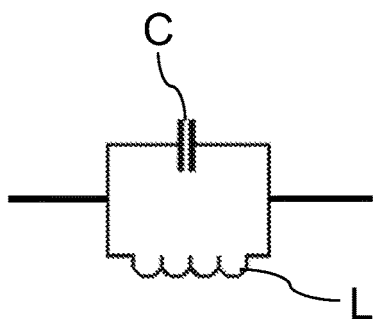
FIG. 17 shows an LC resonant circuit that may be used in conjunction with the apparatus of FIG. 1.
Figure 18:
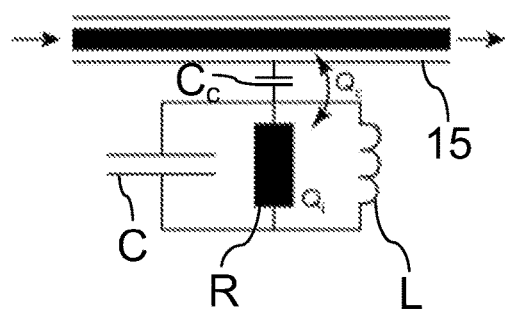
FIG. 18 shows an RLC resonant circuit that may be used in conjunction with the apparatus of FIG. 1.

If coupled resonators are used, then this can be implemented by using coupled microwave resonators. More specifically, the required change in the phase for phase-matching or quasi-phase-matching of the propagating microwave can be achieved by periodically coupling the microwave waveguide 15 to microwave resonators. These resonators would also determine the bandwidth of the microwave signal path. In practice, the coupled microwave resonators can be easily implemented either by using option 1 or option 2. According to option 1, a parallel LC circuit (where L denotes an inductor, and C denotes a capacitor) as shown in FIG. 17 or an RLC circuit (where R denotes a resistor) as shown in FIG. 18 is placed next to the microwave waveguide 15, so that it couples either capacitively of inductively to the waveguide. The inductors and capacitors can be made of discrete components or directly on chip with metal lines and a dielectric. According to option 2, a distributed microwave resonator, or a waveguide type microwave resonator is used, where the waveguide type microwave resonator may be implemented by using a transmission line with an open or short-circuited end, or dielectric material disposed next to the respective waveguide 13, 15.

Figure 19:
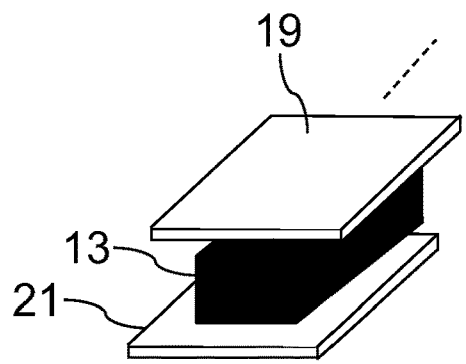
FIG. 19 schematically illustrates the microwave and optical waveguides configuration of FIG. 4c.
Figure 20:
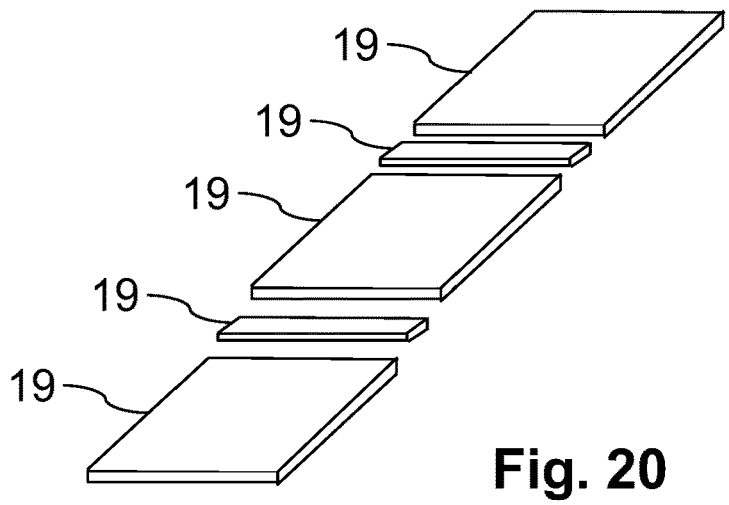
FIG. 20 schematically illustrates an example distributed microwave resonator that may be used in the configuration shown in FIG. 19.
Figure 21:
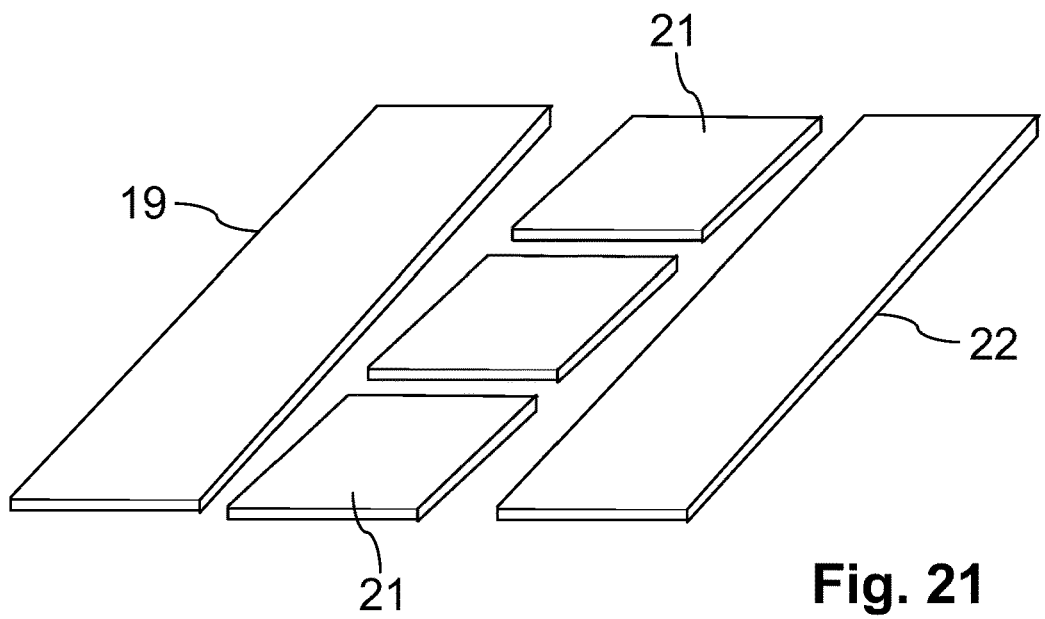
FIG. 21 schematically illustrates an example distributed microwave resonator that may be used in the configuration shown in FIG. 4f.

The distributed microwave resonator according to option 2 is next explained in more detail with illustrations in FIGS. 19 to 21. FIG. 19 represents the configuration of FIG. 4c, where the optical waveguide 13 is located between the first and second electrodes 19, 21. The distributed microwave resonator is in this example obtained by modifying one or both of the superconducting electrodes as shown in FIG. 20. More specifically, the modification may be done by cutting out some portions of the respective electrode 19, 21. FIG. 21 shows how the electrodes may be modified in the configuration of FIG. 4f. In this example, only the middle electrode 21 is modified, but any two of them or all of them could be modified instead. It is to be noted that the leftover regions of the electrode function as distributed microwave resonators. Ideally, these regions are located such that that the resulting alteration takes place periodically, resulting in a suitable alteration of the travelling wave, for example as shown in FIG. 16.

A new microwave-to-optical photon transducer 1 is proposed above. The transducer is designed such that the output optical photon flux (i.e., the number of photons per time unit, such as a second) in the optical sideband(s) is linearly proportional to the input microwave photon flux within a given range of microwave input powers. Thus, the number of photons in the optical sideband signal(s) equals the number of photons in the microwave input signal multiplied by the transducer gain(s), which does not depend on the input microwave power. The gain is defined as the number of outgoing optical photons per incoming microwave photon; in other words, it is a photon number gain. In fact, this gain can equal any number, e.g. 0.01 or 2 or 100 and it depends on many parameters (e.g. geometry, nonlinear optical material used, optical pump power, etc.). The proposed device can achieve a photon number gain greater than 1. In this case, it is an amplifier. This regime is typically required for the efficient detection of single microwave photons. More specifically, the optical waveguide 13 is made of or, it comprises non-linear material such that a first electromagnetic field generated by the optical signal $S_{pi\_int1}$ in the optical waveguide 13 and a second electromagnetic field generated by the microwave signal $S_{in2}$ in the microwave waveguide 15 are arranged to interact and overlap in the non-linear material so that the number of optical photons in the one or more optical sideband signals $S_{out1}$, $S_{out11}$, $S_{out12}$ at the first output port 9 equals the number of microwave photons in the microwave signal $S_{in2}$ at the second input port 5 multiplied by a transducer gain. Stated otherwise, the transducer is configured to use a travelling waves mode for mixing the microwave signal and the optical signal to allow the one or more optical sideband signals to be sensed at the first output port 9 to allow the power of the microwave signal at the second input port 5 to be determined based on the sensed one or more sideband signals as the power or other property (such as the voltage or current value) of the one or more optical sideband signals depends, and in this case linearly depends on the power of the microwave signal at the second input port 5. The optical and microwave waveguides are thus configured to allow travelling microwave signals, and travelling optical signals, respectively, to propagate through them while allowing them to be mixed. According to the first embodiment, the microwave signal itself is amplified in the non-linear material, while according to the second embodiment, the microwave signal when considered at the transducer output is not modified by the interaction with the optical pump signal.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. Further embodiments may be obtained by combining any of the above teachings.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A microwave-to-optical photon transducer for providing coupling between at least a microwave signal ($S_{in2}$) and an optical signal ($S_{pi\_in1}$, $S_{pi\_out1}$), the transducer comprising:
a first input port for receiving the optical signal ($S_{pi\_in1}$);
a second input port for receiving the microwave signal ($S_{in2}$);
a first output port for outputting the optical signal ($S_{pi\_out1}$) and one or more optical sideband signals ($S_{out1}$, $S_{out11}$, $S_{out12}$);
a first waveguide disposed between the first input port and the first output port to allow the optical signal ($S_{pi\_in1}$) and the one or more optical sideband signals ($S_{out1}$, $S_{out11}$, $S_{out12}$) to propagate in the first waveguide;
a second waveguide connected to the second input port, and extending in the transducer adjacent to the first waveguide to allow the microwave signal ($S_{in2}$) to propagate in the second waveguide;
a phase-matching arrangement to cause at least the optical signal ($S_{pi\_in1}$) in the first waveguide and the microwave signal ($S_{in2}$) in the second waveguide to be phase-matched or quasi-phase-matched,
wherein the first waveguide is made of non-linear material or comprises non-linear material such that a first electromagnetic field generated by the optical signal ($S_{pi\_in1}$) in the first waveguide and a second electromagnetic field generated by the microwave signal ($S_{in2}$) in the second waveguide are arranged to interact and overlap in the non-linear material, and wherein the transducer is configured to use travelling waves for mixing the microwave signal and the optical signal to allow the one or more optical sideband signals ($S_{out1}$, $S_{out11}$, $S_{out12}$) to be sensed at the first output port to allow the power of the microwave signal at the second input port to be determined based on the sensed one or more sideband signals.

2. The transducer according to claim 1, wherein the non-linear material has at least a second order nonlinearity for generating the one or more sideband signals ($S_{out1}$, $S_{out11}$, $S_{out12}$) as a sum frequency signal and/or a difference frequency signal from the first and second electromagnetic fields.

3. The transducer according to claim 1, wherein the second waveguide comprises at least a first electrode and a second electrode separated from the first electrode by a dielectric.

4. The transducer according to claim 3, wherein the first waveguide is disposed between the first electrode and the second electrode, or wherein the first and second electrodes are disposed on one side of the first waveguide.

5. The transducer according to claim 1, wherein the transducer further comprises a pump source for generating the optical signal ($S_{pi\_in1}$).

6. The transducer according to claim 1, wherein the transducer further comprises a second output port connected to the second waveguide, and wherein the second waveguide extends between the second input port and the second output port.

7. The transducer according to claim 1, wherein the first waveguide comprises a non-linear component comprising the non-linear material, and a linear component comprising linear material.

8. The transducer according to claim 1, wherein the transducer further comprises a periodic structure at least within the first waveguide and/or on its surface and/or outside of it for creating at least one photonic band gap.

9. The transducer according to claim 8, wherein the non-linear material has at least a second-order nonlinearity for capable of generating a lower-sideband signal ($S_{out11}$) as a difference-frequency signal from the first and second electromagnetic fields, and an upper-sideband signal ($S_{out12}$) as a sum-frequency signal from the first and second electromagnetic fields, and wherein the periodic structure is configured so that the upper-sideband signal falls into at least one photonic band gap.

10. The transducer according to claim 8, wherein the periodic structure comprises a periodic set of holes within the first waveguide and/or outside of it, and/or the periodic structure comprises a periodic set of blocks on the first waveguide, and/or the periodic structure is formed by a periodically varied cross-section of the first waveguide along a longitudinal axis of the first waveguide.

11. The transducer according to claim 8, wherein the periodic structure comprises elements arranged at predefined intervals, and wherein a dimension of the elements substantially orthogonal to a longitudinal axis of the first waveguide is in the range of 0.1 µm to 10 µm.

12. The transducer according to claim 1, wherein the phase-matching arrangement is placed within at least one of the first and second waveguides or capacitively connected to the second waveguide.

13. The transducer according to claim 1, wherein the phase-matching arrangement comprises at least one of: one or more delay lines, one or more coupled resonators, a periodically varying distance between the first and second waveguides, a periodically varying size of at least one of the first and second waveguides, local modifications of the refractive index, and a periodically poled structure.

14. The transducer according to claim 1, wherein the first waveguide and the second waveguide where the first electromagnetic field and the second electromagnetic field are arranged to interact are non-resonator elements.

15. The transducer according to claim 1, wherein the transducer is a non-resonant apparatus.

16. A microwave signal detection system comprising the transducer according to claim 1, and further comprising a sensor coupled directly or indirectly to the first output port for detecting the one or more optical sideband signals ($S_{out1}$, $S_{out11}$, $S_{out12}$) for sensing the microwave signal at the second input port.

17. A method of operating the transducer according to claim 1, the method comprising:
   simultaneously applying the optical signal ($S_{pi\_in1}$) to the first input port and the microwave signal ($S_{in2}$) to the second input port;
   sensing the one or more sideband signals ($S_{out1}$, $S_{out11}$, $S_{out12}$); and
   determining the power of the microwave signal ($S_{in2}$) at the second input port based on the sensed one or more sideband signals ($S_{out1}$, $S_{out11}$, $S_{out12}$).

* * * * *